United States Patent

[11] 3,554,443

| [72] | Inventor | Nathaniel Hughes<br>Beverly Hills, Calif. |
|---|---|---|
| [21] | Appl. No. | 827,451 |
| [22] | Filed | Apr. 23, 1969 |
| [45] | Patented | Jan. 12, 1971 |
| [73] | Assignee | Energy Sciences, Inc.<br>El Segundo, Calif.<br>a corporation of California |

[54] PHASE-RESONANT STREAMING
11 Claims, 3 Drawing Figs.

[52] U.S. Cl. ................................................ 239/4,
239/102, 116/137
[51] Int. Cl. ................................................ B05b 7/04
[50] Field of Search ................................ 239/4, 102;
116/137A

[56] References Cited
UNITED STATES PATENTS

| 3,071,145 | 1/1963 | Blanchard...................... | 116/137A |
| 3,226,029 | 12/1965 | Goodman et al. ............ | 239/102X |
| 3,432,804 | 3/1969 | Beeken......................... | 116/137X |

*Primary Examiner*—M. Henson Wood, Jr.
*Assistant Examiner*—John J. Love
*Attorney*—William W. Rymer, Jr.

ABSTRACT: Boundary layer sculpted supersonic nozzle with holes thereinto of diameter such that the frequency corresponding to a wavelength equal thereto is within 10 percent of being equal to, or a multiple or submultiple of, the shock wave frequency associated with the main stream passing through the nozzle.

PATENTED JAN 12 1971 3,554,443

PHASE-RESONANT STREAMING

This invention relates to streaming at supersonic speeds using small nozzles of the general character disclosed in the following pending applications of Nathaniel Hughes: Ser. No. 718,447, filed Apr. 3, 1968, "Supersonic Streaming;" Ser. No. 734,089, filed Jun. 3, 1968, "Streaming;" and Ser. No. 788,145, filed Nov. 22, 1968, "Streaming" in all of which effective nozzle surfaces within preferably cylindrical bores are defined by boundary layer effects.

Objects of the invention are to enhance the directly useable (e.g., for liquid atomization) energy in gas streams, with small nozzles that can be simply and efficiently incorporated into a wide variety of physical processes.

The invention features a boundary layer sculpted supersonic nozzle, with holes thereinto of diameter such that the frequency corresponding to a wave of length equal thereto is within 10 percent of being equal to, or a multiple or submultiple of, the shock wave frequency associated with the main stream passing through the nozzle. In preferred embodiments the inlet and throat plane stabilization holes are connected to a common source of fluid, the inlet is surrounded by a ring of holes, and the frequencies associated will all orifices into the nozzle are within 10 percent of being equal to, or a multiple or submultiple of, the shock wave frequency. In another aspect of the invention, the nozzle is mounted in a cell to define a Helmholtz resonator cavity in which the nozzle is disposed, the cavity having a depth such that the frequency of sound waves having a wavelength equal thereto is within 10 percent of being equal to, or a multiple or submultiple of, the shock wave frequency.

Other objects, features, and advantages of the invention will be apparent from the following description of a preferred embodiment thereof, taken together with the drawings thereof, in which.

Figure 1:
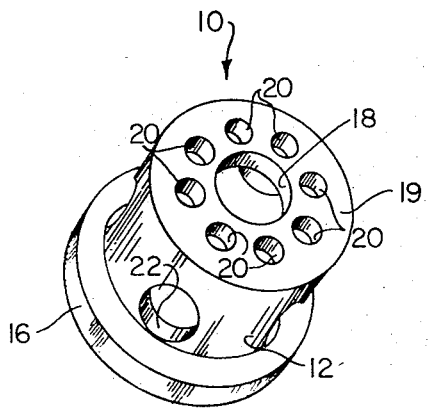
FIGS. 1 and 2 are perspective views, from different vantage points.
Figure 2:
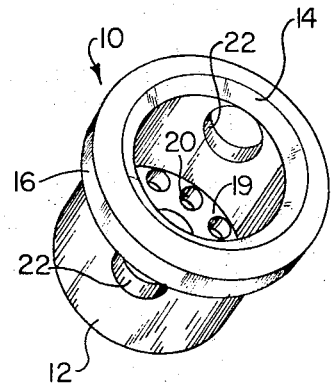
Figure 3:
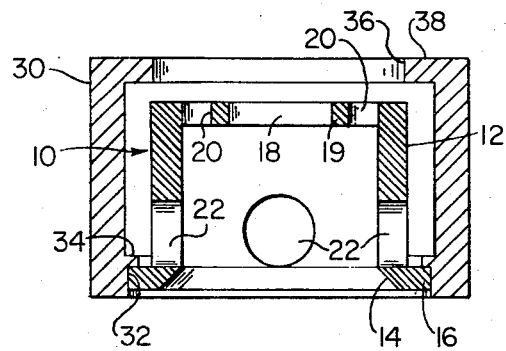
FIG. 3 is a vertical sectional view showing the nozzle of FIGS. 1 and 2 mounted, as preferred, in a cell.

Nozzle 10 has a cylindrical wall 12 (outside diameter 0.346 inch, inside diameter 0.260 inch) open at its outlet end across 45° countersink 14, which is surrounded by annular flange 16. Axial inlet 18 (diameter 0.177 inch) in end wall 19 is concentric with an imaginary circle (diameter 0.226 inch) containing the centers of eight equally spaced holes 20 (each of diameter 0.0315 inch). Four radial throat plane stabilization holes 22 (each of diameter 0.093 inch) in wall 12 have coplanar axes spaced 90°.

The nozzle is mounted in cell 30 (largest inside diameter 0.431 inch) with flange 16 tightly secured in counterbore 32 against flange 34 (inside diameter 0.398 inch). Cell 30 has an inlet hole 36 (diameter 0.345 inch) in end wall 38.

Additional dimensions of the assembly are:

Length of cell 30 between upstream face of wall 38 and upstream edge of countersink 14, inch—0.307.
Length of nozzle 10 between downstream face of wall 19 and upstream edge of countersink 14, inch—0.221.
Depth of countersink 14, inch—0.029.

In operation, gas, at pressure $P_i$ greater than atmospheric pressure, is supplied to cell inlet 36 and flows through nozzle inlet 18, holes 20, and throat plane stabilization holes 22. The gas flowing through inlet 18 maintains a core stream having an area transverse to the direction of flow which is always less than that provided inside wall 12, contracts to a minimum in the neighborhood of holes 22, and diverges thereafter. The gas flowing through holes 20 and 22 surrounds the core stream, so that the latter in effect passes through a fluid sculpted converging-diverging nozzle with a throat plane diameter $D^*$ sufficiently small so that the core stream is accelerated to supersonic velocity, with the resultant production of shock waves having characteristic wavelength and frequency. Additionally, the gas passing through inlet 18 and holes 20 and 22 has associated therewith characteristic frequencies and wavelengths respectively directly attributable to its passage through these orifices, and, since those frequencies are closely coordinated (as explained in detail below) with that characteristic of the core stream, the energy made available at the nozzle outlet is greatly enhanced. Further enhancing outlet energy is the fact that cell 30 and nozzle 10 define between the upstream face of wall 38 and the beginning of countersink 14 a cavity that acts as a Helmholtz resonator to reinforce with sound waves the core stream shock waves.

The frequencies respectively associated with flow through inlet 18 and holes 20 and 22 are, for purposes practical here, determined solely by the hole diameters, which are chosen to equal the wavelength corresponding to the desired frequency.

The shock wavelength, $\lambda$, for the core stream, is given by the equation $$\lambda = 1.307 D^* \sqrt{M_o^2 - 1}$$

where $M_o$ is the Mach number of the core stream at the nozzle outlet.

Operation of the preferred embodiment described above at a $P_i$ of 20 p.s.i.g., and an inlet temperature of 528° R., yields the following operating data:

$D^*$, inch—0.065.
$M_0$—2.51.
$\lambda$, inch—0.194.
Flow through hole 18, c.f.m—2.100. (Converted to atmospheric pressure and ambient temperature.)
Flow through holes 22, c.f.m—15.8. (Similarly converted.)

At the nozzle outlet, the core stream has a temperature of 234° R., at which temperature the local speed of sound is 749 ft./sec. At the nozzle outlet, therefore, the core stream shock waves, traveling at the local speed of sound, have a frequency of 46,320 c.p.s.

The wavelength characteristic of the air passing through holes 22 (at a temperature of essentially 528° R., so that the local velocity of sound is 1,125 ft./sec.), is 0.093 inch, so that the corresponding frequency is 145,200 c.p.s., or well within 10 percent of being three times the core shock frequency. Similarly, the frequency characteristic of the air passing through holes 20 (at temperature 528° R.) is 435,600 c.p.s., close to nine times the core shock frequency. The corresponding frequency for inlet 18 is 7,620 c.p.s., or very close to one-sixth of the core shock frequency. The soundwave frequency (at 528° R.) associated with the Helmholtz resonator cavity (cavity depth 0.307 inch) is 44,040 c.p.s., very close to the core shock frequency itself. The frequencies associated with all streams reinforce each other at the nozzle outlet, resulting in greatly enhanced energy production there.

Other embodiments will occur to those skilled in the art and are within the following claims.

I claim:

1. A supersonic nozzle device comprising:
   a boundary layer confining wall with inlet and outlet ends;
   a portion at said inlet end defining a nozzle inlet for receiving a subsonic stream to be given a transonic speed and to be discharged as a supersonic stream at said outlet end with shock waves having a characteristic frequency; and
   holes into said nozzle of diameter such that the frequency corresponding to a wave of length equal thereto is within 10 percent of being equal to, or a multiple or submultiple of, said characteristic frequency.

2. The device of claim 1 wherein said holes include throat plane stabilization holes in said wall intermediate said ends.

3. The device of claim 1 wherein said inlet and said holes are connected to a common source of fluid.

4. The device of claim 1 wherein said portion has a ring of holes surrounding said inlet, each having a diameter such that the frequency corresponding to a wave of length equal thereto is within 10 percent of being equal to, or a multiple or submultiple of, said characteristic frequency.

5. The device of claim 1 wherein said inlet has a diameter such that the frequency corresponding to a wave of length equal thereto is within 10 percent of being equal to, or a multiple or submultiple of, said characteristic frequency.

6. The device of claim 2 wherein every orifice into said device has a diameter such that the frequency corresponding to a wave of length equal thereto is within 10 percent of being equal to, or a multiple or submultiple of, said characteristic frequency.

7. The device of claim 6 wherein said orifices include a ring of holes surrounding said inlet.

8. The method of producing an enhanced shock, comprising introducing gas at the inlet of a boundary layer sculpted supersonic nozzle device, and simultaneously introducing gas at holes into said boundary layer sculpted supersonic nozzle device, and selecting the diameter of said holes so that the frequency corresponding to a wave of length equal to said diameter is within 10 percent of being equal to, or a multiple or submultiple of, the shock wave frequency associated with the main stream passing through said nozzle.

9. The method of claim 8 wherein said holes are throat plane stabilization holes.

10. The device of claim 1 mounted in a cell defining at least in part a Helmholtz resonator cavity in which said nozzle is disposed, said cavity having a depth such that the frequency of sound waves having a wavelength equal thereto is within 10 percent of being equal to, or a multiple or submultiple of, said characteristic frequency.

11. A supersonic nozzle device comprising:
a boundary layer confining wall with inlet and outlet ends; and
a portion at said inlet end defining a nozzle inlet for receiving a subsonic stream to be given a transonic speed and to be discharged as a supersonic stream at said outlet end with shock waves having a characteristic frequency;
said nozzle being mounted in a cell to define a Helmholtz resonator cavity in which said nozzle is disposed, said cavity having a depth such that the frequency of sound waves having a wavelength equal thereto is within 10 percent of being equal to, or a multiple or submultiple of, said characteristic frequency.